United States Patent [19]
Cochinwala et al.

[11] Patent Number: 5,960,178
[45] Date of Patent: Sep. 28, 1999

[54] QUEUE SYSTEM AND METHOD FOR POINT-TO-POINT MESSAGE PASSING HAVING A SEPARATE TABLE FOR STORING MESSAGE STATE AND IDENTIFIER OF PROCESSOR ASSIGNED TO PROCESS THE MESSAGE

[75] Inventors: Munir Cochinwala, Basking Ridge; Kuo-Chu Lee, Princeton Junction, both of N.J.

[73] Assignee: Bell Communications Research, Inc., Morristown, N.J.

[21] Appl. No.: 08/907,445

[22] Filed: Aug. 8, 1997

[51] Int. Cl.[6] .................................................. G06F 15/163
[52] U.S. Cl. .................... 395/200.62; 395/675; 370/412; 379/266
[58] Field of Search .............................. 395/200.62, 675, 395/674; 370/412; 379/112, 114, 115, 156, 266, 207, 208

[56] References Cited

U.S. PATENT DOCUMENTS

| | | | |
|---|---|---|---|
| 5,428,781 | 6/1995 | Duault et al. ........................... | 395/672 |
| 5,507,032 | 4/1996 | Kimura ....................................... | 710/6 |
| 5,592,672 | 1/1997 | Grewal et al. ........................... | 395/675 |
| 5,644,575 | 7/1997 | McDaniel ................................ | 370/416 |
| 5,692,033 | 11/1997 | Farris ...................................... | 379/67.1 |
| 5,696,809 | 12/1997 | Voit .............................................. | 379/5 |

*Primary Examiner*—Dung C. Dinh
*Attorney, Agent, or Firm*—Joseph Giordano; David A. Hey

[57] ABSTRACT

A queuing system and method to provide efficient and effective message communication between computers, processing devices, or network elements. The queue includes three tables. A message data table includes the message data. A message state table identifies several parameters about a message including a message time-stamp, state, and partition. The partition associates the message with a predetermined one of several message processors used to send and receive messages. Each message processor selects and sends only messages having a corresponding partition. The queue further includes a queued message table that lists all messages destined for a computer or other processing device that cannot receive messages. In this manner, failed messages in the queued table are taken out of a processing queue until the off-line computer or other processing device comes back on line.

7 Claims, 4 Drawing Sheets

FIG. 2

| MESSAGE I.D. | DESTINATION I.D. | PARTITION | STATE | TIMESTAMP |
|---|---|---|---|---|
|  |  |  |  |  |
| ... | ... | ... | ... | ... |
|  |  |  |  |  |

| MESSAGE I.D. | DATA |
|---|---|
|  |  |
| ... | ... |
|  |  |

| MESSAGE I.D. | DESTINATION I.D. | PARTITION | TIMESTAMP |
|---|---|---|---|
|  |  |  |  |
| ... | ... | ... | ... |
|  |  |  |  |

212

500, 502, 504, 506

QUEUE SYSTEM AND METHOD FOR POINT-TO-POINT MESSAGE PASSING HAVING A SEPARATE TABLE FOR STORING MESSAGE STATE AND IDENTIFIER OF PROCESSOR ASSIGNED TO PROCESS THE MESSAGE

CROSS-REFERENCE TO RELATED APPLICATIONS

This application is related to Lee-Yu application Ser. No. 08/908,641, "Process Control Monitor System and Method"; Cochinwala-Lee-Yu application Ser. No. 08/907,705, "High Performance Asynchronous Data Replication" and Cochinwala-Lee-Yu-Cheng-Liu-Hwang-Tong application Ser. No. 08/907,752, "Fault Tolerant Distributing Client/Server Data Communication System and Method", all filed Aug. 8, 1997.

BACKGROUND OF THE INVENTION

The present invention relates to communications between computers in general, and more particularly, to efficient, reliable point-to-point message passing between computers.

Computers, processors, and network elements communicate with each other by sending and receiving control and data messages. In large, complex networks, such as today's advanced intelligent telephone network ("AIN"), demands for message processing are extremely high. Such large networks must process millions of messages every day, with very little margin for error. Thus, efficient and effective message processing in such networks is a premium. Network elements that comprise networks are often connected to a plurality of other network elements and communicate with them in parallel, which further increases the message processing demands.

To effect message processing, computers, processors, and network elements typically include a plurality of message processors to process, send, and receive queued messages.

Conventional message processors typically process messages from a first-in-first-out (FIFO) message queue. Since only one processor can access the queue at one time, problems of scale and performance occur. Adding multiple processors compounds problems because they block each other out trying to access the queue. In these conventional systems, failed messages, i.e. messages destined for a computer, processor, or network element that for some reason is not communicating, are simply placed back into the FIFO queue each time they fail. The continuous processing of these failed messages wastes significant and valuable processing time. Accordingly, it is an object of the present invention to provide an efficient, reliable, and sealable process and system whereby messages destined for failed destinations do not interfere with normal flow.

Additional objectives, features, and advantages of the invention will be set forth in the description which follows, and in part will be apparent from the description, or may be learned by practice of the invention. The objectives and other advantages of the invention will be realized and attained by means of the instrumentalities and combinations particularly pointed out in the written description and appended claims hereof as well as the appended drawings.

DESCRIPTION OF THE INVENTION

To achieve these and other advantages and in accordance with the purposes of the invention, as embodied and broadly described, the invention includes a computer connected to one or more other computers and including one or more message processors for communicating with the one or more devices, a message queue, including a first table to store message data, a second table to store information about each message, including a message state and a message partition, the message partition being an identifier to associate a message with a particular one of the one or more message processors.

The invention further includes in a computer, a method of processing messages to be sent to a destination computer, including the steps of assigning a partition to a message, assigning the message to a first message table, creating an entry for the message in a second table, the entry including the partition and a state, and selecting the message for transmission based on the partition.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate presently preferred implementations of the invention and, together with the general description given above and the detailed description of the preferred implementations given below, serve to explain the principles of the invention.

In the drawings:

FIG. 2 is a block diagram of a message state table in accordance with a preferred embodiment of the present invention;

FIG. 3 is a block diagram of a message data table in accordance with a picture embodiment of the present invention;

FIG. 4 is a block diagram of a queued message table in accordance with a preferred embodiment of the present invention;

BEST MODE FOR CARRYING OUT THE INVENTION

Reference will now be made in detail to the construction and operation of preferred implementations of the present invention which are illustrated in the accompanying drawings. In those drawings, like elements and operations are designated with the same reference numbers.

The following description of the preferred implementations of the present invention is only exemplary of the invention. The present invention is not limited to these implementations, but may be realized by other implementations. Throughout this application, the term "computer" is used to generically identify any type of computer, processor, or network element that may incorporate the message processing features of the present invention. The present invention is not limited to a particular application but is intended to include all applications and uses requiring message processing.

Figure 1:
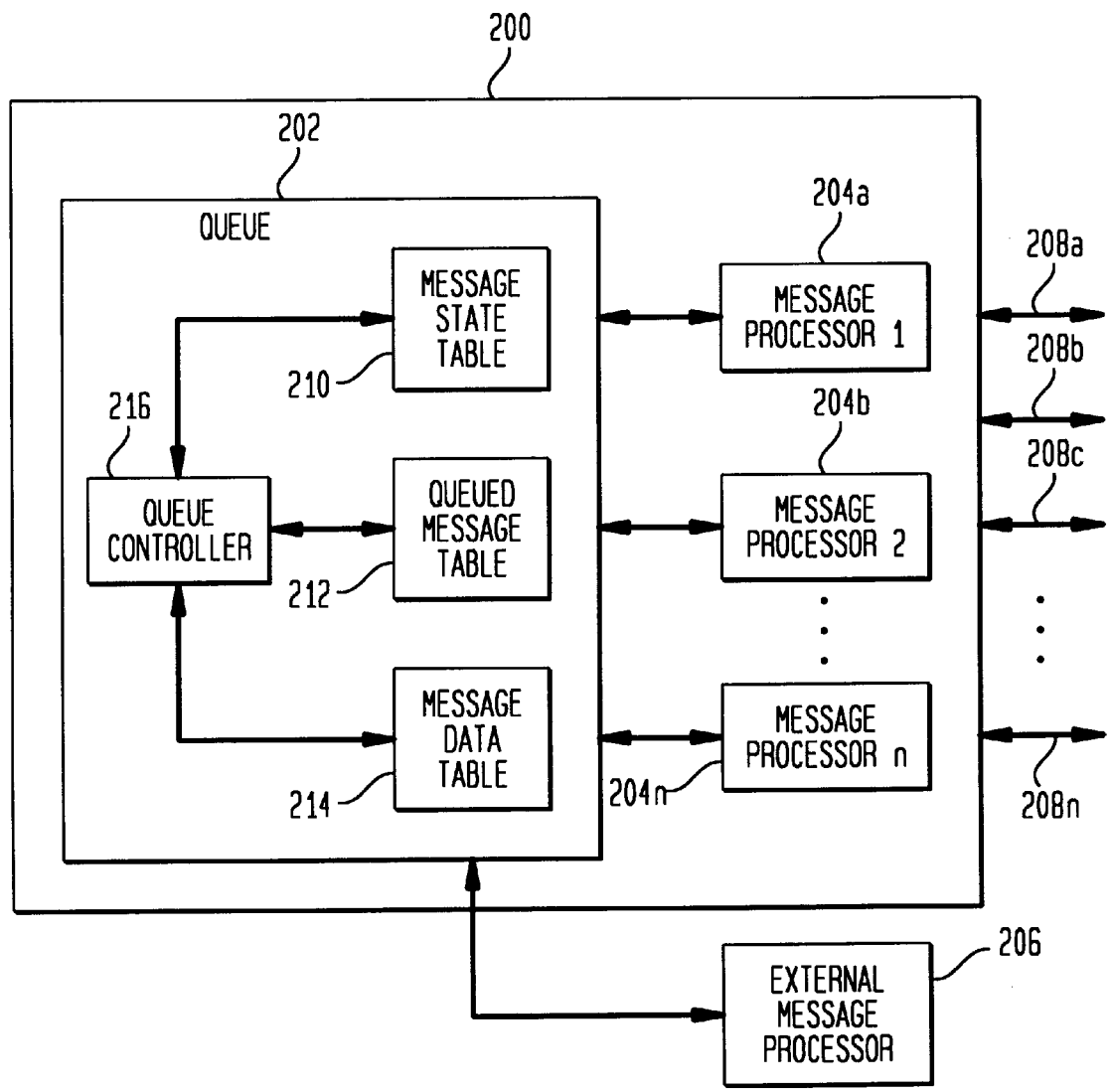
FIG. 1 is a block diagram of a computer and queue configuration in accordance with a preferred embodiment of the present invention.

FIG. 1 is a block diagram of a computer 200 having a queue configuration in accordance with a preferred embodiment of the present invention. Computer 200 may comprise, for example, a service management system ("SCP") within today's AIN. SMSs are typically connected to service control points ("SCP") by X.25 connections.

As shown, computer 200 includes a queue 202 and a plurality of message processors 204a–204n. Queue 202 preferably comprises a database configuration which is connected to and communicates with the plurality of message processors 204a–204n. Message processors 204a–204n preferably include read/write or send/receive processing applications for performing input/output operations between computer 200 and any one of several computers (not shown) connected to computer 200 via communication lines 208a–208n. Message processors from other computers (external message processors 206) may also use queue 202 to communicate with computers to which it is connected (not shown).

In accordance with a preferred embodiment of the invention, queue 202 includes state table 210, queued message table 212, message data table 214, and queue controller 216. In accordance with the present invention, message data is included in message data table 214, while parameters used to optimize communications are stored in message state table 210. Queued message table 212 stores certain parameters also found in the message state table 210 for any failed messages, i.e. messages that could not be communicated to the intended destination computer. Queue controller 216 preferably includes an application for controlling queue 202 and the three tasks 210, 212, and 214 as further described herein.

FIG. 2 is a block diagram of a message state table 210 in accordance with a preferred embodiment of the present invention. As shown, for each message to be communicated, message state table 210 preferably includes the following information: message I.D. 300, destination I.D. 302, partition 304, state 306, and time-stamp 308. Message I.D. 300 uniquely identifies the message, destination I.D. 302 identifies a computer for which the message is destined, and time-stamp 308 specifies the time at which the message entered the FIFO queue.

Partition 304 links a message to one of the message processors 204a–204n. In accordance with the present invention, as described below, in a preferred embodiment, message controller 216 assigns each message a partition as it enters queue 202. Message controller 216 preferably distributes messages evenly across each of the corresponding message processors 204a–204n. For example, if computer 200 includes ten message processors, for 100 messages, 10 are assigned to each message processor. This distribution is, however, distributable. In accordance with the present invention, each message processors 204a–204n processes only messages having the corresponding partition. In this manner, message processors are not locked out and can perform parallel processing without risk of overlap.

Referring again to FIG. 2, state 306 preferably identifies one of five message states or conditions: 1) ready for send; 2) sending; 3) processed; 4) ready for delete; 5) queued. The first four states are conventional communication states. The fifth state, "queued" specifies the state of being included in the queued message table 212, which is described in more detail below.

FIG. 3 shows a block diagram of a message data table 214n in accordance with a preferred embodiment of the invention. Message data table 214 includes message I.D. 400 and data 402. Thus, in accordance with a preferred embodiment of the present invention, the actual message data 402 is listed in a table 214 separate from the message state table 210. Message I.D.s 400 correspond to message I.D.s 300.

FIG. 4 illustrates a block diagram of a queued message table 212 in accordance with a preferred embodiment of the present invention. Queued message table 212 stores messages destined for computers (not shown) that are down or for some other reason are not receiving messages. In accordance with conventional techniques, computer 200 determines from one or more failed communication transmissions that a connected computer (not shown) is no longer "on-line." In accordance with a preferred embodiment of the present invention, messages which cannot be transmitted by one of message processors 204a–204n, are stored in the queued message table 212 until the destination machine provides an indication that it is again capable of receiving messages. At that time, state 306 of any queued message is changed from "queued" to "ready to send."

As shown in FIG. 4, for each queued message, the queued message table 212 includes message I.D. 500, destination I.D. 502, partition 504, and time-stamp 506. Each of these headings corresponds to the same information of the corresponding heading in the message state table 210 as shown in FIG. 3.

Figure 5:
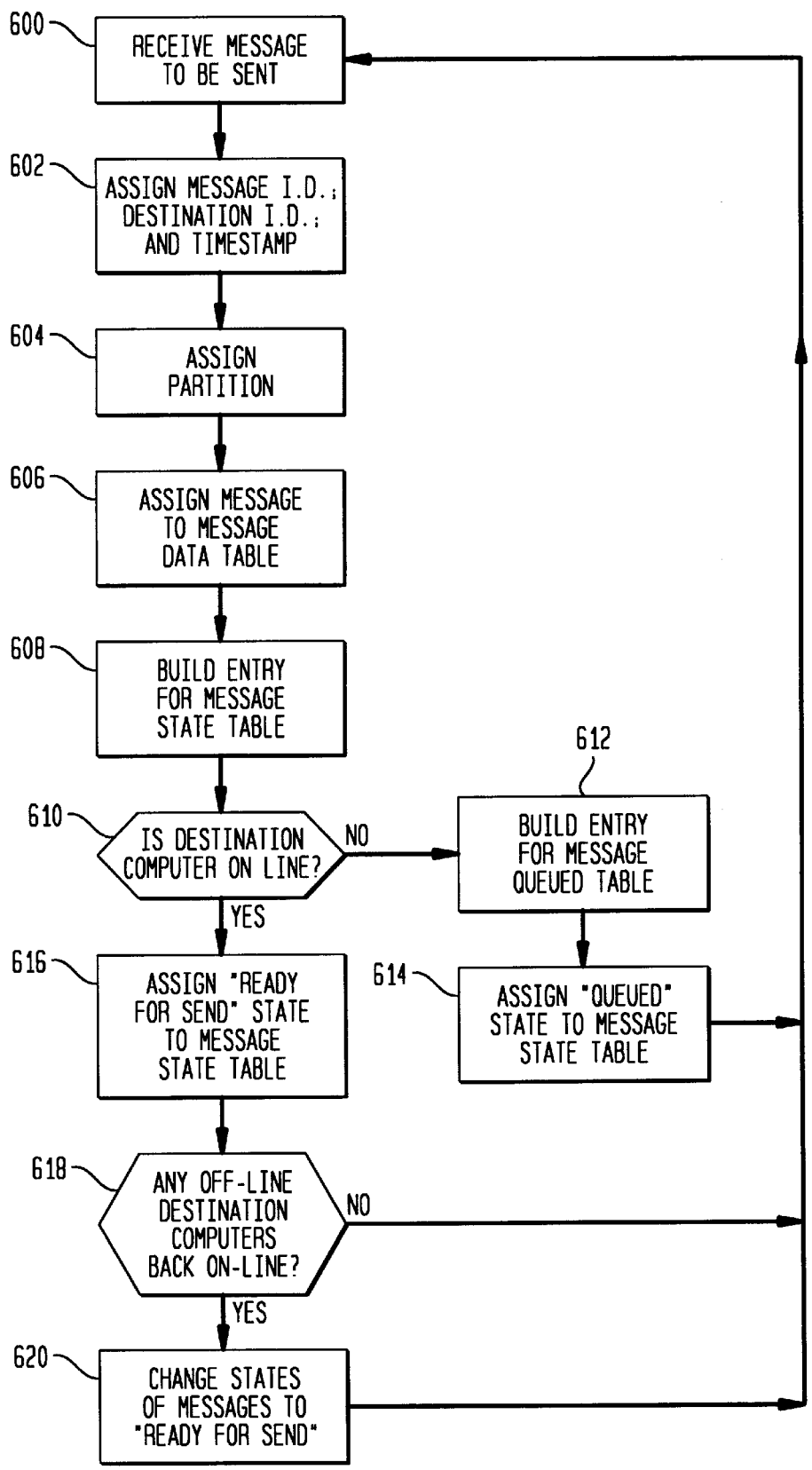
FIG. 5 is a process flow diagram of the operation of a message controller in accordance with one embodiment of the present invention.

FIG. 5 is a processing flow diagram of the operation of queue controller 216 to help illustrate the methods by which messages are processed in accordance with an embodiment of the present invention.

Initially, queue controller 216 receives a message to be transmitted to any of one or more connected machines (not shown) (step 600). Queue controller 216 then assigns the message a message I.D., a destination I.D., and a time-stamp, preferably in accordance with conventional techniques (step 602). Queue controller 216 then assigns a partition to the message, as discussed above with regard to FIG. 3 (step 604). Having assigned this information to the message, queue controller 216 assigns the message I.D. 400 and data 402 to the message data table 214 (step 606), and builds an entry for the message state table 210 (step 608).

Queue controller 216 then inquires whether the destination computer for that message is "on-line" (step 610). If not, it builds an entry for the queued message table 212 (step 612) and assigns the message a "queued" state in the message state table (step 614). If, however, the destination machine is "on-line," queue controller 216 assigns the message a "ready for send" state (step 616). Queue controller 216 then inquires whether any "off-line" destination machines have come back "on-line" (step 618). If not, processing is complete. If so, however, queue controller 216 changes the state of those messages intended for the back "on-line" destination computers to "ready for send" (step 620), before returning to process a new message.

Figure 6:
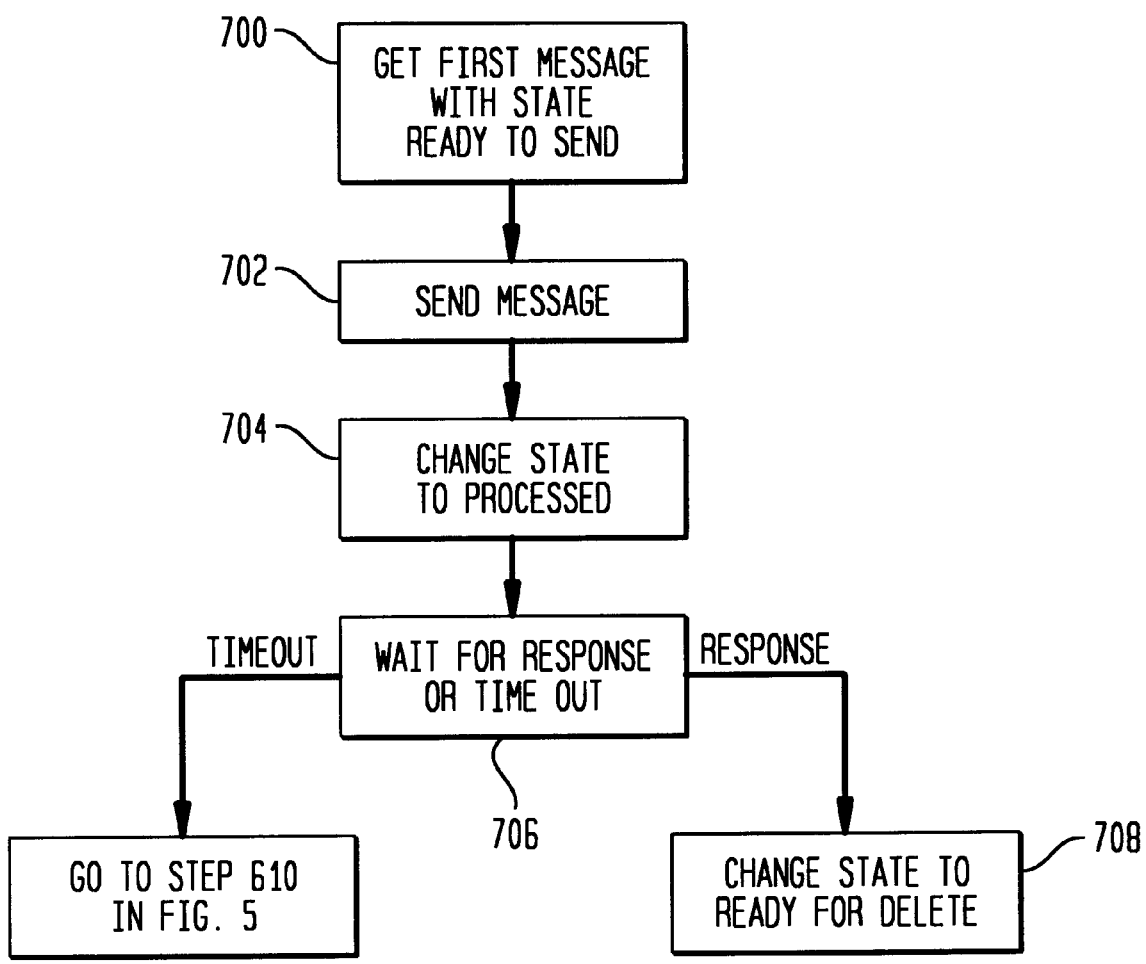
FIG. 6 is a process flow diagram of the operation of a message processor in accordance with one embodiment of the present invention.

FIG. 6 is a process flow diagram of the operation of any one of message processors 204a–204n or 206 for sending a message to a destination machine. Initially, a message processor 204 scans the message state table 210 and selects the first message with a state "ready to send" (step 700). Message processor 204 then sends that message to the destination machine (step 702) and changes the message state in "processed" (step 704). Message processor 204 then waits for a response from the destination machine (step 706). If it receives a response within a predetermined time period, message processor 204 changes the message state to "delete" (step 708). The message can then be removed from the queue 202. The predetermined time period is configurable and is preferably 5 seconds.

If the message processor 204 does not receive a response from the destination machine within the predetermined time period, it executes process steps like those described in steps 610–614 in FIG. 5.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In a preferred embodiment of the present invention, queue controller 216 and message processors 204–204a comprise software applications programmed to execute the corresponding functions described herein. However, in accordance with the present invention, the elements may comprise any form of conventional hardware processor or controller, independent or otherwise, or any combination of hardware and software.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

We claim:

1. In a computer connected to one or more other computers and including one or more message processors for communicating with said one or more devices, a message queue, comprising:

a first table to store message data;

a second table to store information about each message, including a message state and a message partition, said message partition being an identifier to associate a message with a particular one of said one or more message processors.

2. A message queue according to claim 1, further comprising a third table to store messages destined for said one or more other computers when communication fails with said one or more other computers.

3. A computer for communicating with one or more other computers, comprising:

a plurality of message processors for sending and receiving messages to and from said one or more other computers;

a first table to store message data;

a second table to store information about each message, including a message state and a message partition, said message partition being an identifier to associate a message with a particular one of said one or more message processors; and a queue controller for assigning partitions to each message.

4. A computer according to claim 3, further comprising a third table to store messages destined for said one or more other computers when communications fail with said one or more other computers.

5. In a computer, a method of processing messages to be sent to a destination computer, comprising the steps of:

assigning a partition to a message;

assigning said message to a first message table;

creating an entry for said message in a second table, said entry including said partition and a state;

selecting said message for transmission based on said partition.

6. A method according to claim 5, further comprising the steps of:

building an entry for a third table when said message is destined for a computer that cannot receive messages; and setting the state for said message to a queued state in said second table.

7. In a computer having a plurality of message processors for communicating with other computers, a method, executed by each message processor, of processing messages to be sent to another computer, comprising the steps of:

selecting only messages having a partition corresponding to said message processor, said partition being an identifier to associate each message to one of said plurality of message processors;

transmitting said message to a destination computer; and assigning a message to a table if said destination computer cannot receive said message, said table identifying all messages that could not be sent.

* * * * *